(12) United States Patent
Jenkins et al.

(10) Patent No.: US 12,525,135 B2
(45) Date of Patent: Jan. 13, 2026

(54) UAV FLIGHT CONTROL OPERATIONS FOR PREDICTED TRAFFIC ENCOUNTER

(71) Applicant: Wing Aviation LLC, Mountain View, CA (US)

(72) Inventors: Kevin Jenkins, Dallas, TX (US); John Gordon Mooney, Athens, GA (US)

(73) Assignee: Wing Aviation LLC, Palo Alto, CA (US)

( * ) Notice: Subject to any disclaimer, the term of this patent is extended or adjusted under 35 U.S.C. 154(b) by 174 days.

(21) Appl. No.: 18/215,013

(22) Filed: Jun. 27, 2023

(65) Prior Publication Data
US 2025/0006061 A1    Jan. 2, 2025

(51) Int. Cl.
*G08G 5/34* (2025.01)
*G05D 1/611* (2024.01)
(Continued)

(52) U.S. Cl.
CPC .............. *G08G 5/34* (2025.01); *G05D 1/611* (2024.01); *G08G 5/55* (2025.01); *G08G 5/57* (2025.01);
(Continued)

(58) Field of Classification Search
CPC .. G08G 5/34; G08G 5/80; G08G 5/57; G08G 5/727; G08G 5/55; G08G 5/59; G08G 5/723; G08G 5/21; G08G 5/22; G08G 5/26; B64D 47/06; G05D 1/1064; G05D 2107/13; G05D 1/611
See application file for complete search history.

(56) References Cited

U.S. PATENT DOCUMENTS

2006/0058931 A1*  3/2006  Ariyur ................... G08G 5/723
                                                                 701/23
2010/0131121 A1*  5/2010  Gerlock .................. G08G 5/55
                                                                 701/2
(Continued)

FOREIGN PATENT DOCUMENTS

WO    WO-2022094978 A1 *  5/2022

OTHER PUBLICATIONS

WO 2022094978A1, "Unmanned Aerial Vehicle Control Method and System, and Unmanned Aerial Vehicle and Storage Medium", Jia et al., Filed: Nov. 6, 2020 Pub: May 12, 2022, English Translation (Year: 2022).*

*Primary Examiner* — Jason Holloway
*Assistant Examiner* — Benjamin J Brosh
(74) *Attorney, Agent, or Firm* — McDonnell Boehnen Hulbert & Berghoff LLP

(57) ABSTRACT

A method is disclosed. The method includes receiving an indication of presence of an aircraft in a vicinity of an uncrewed aerial vehicle (UAV) which is flying along a flight path. The method also includes decelerating, based on the received indication, the UAV to reduce a ground speed along the flight path. The method additionally includes descending, after reducing the ground speed, the UAV to a hover position. The method further includes determining, while the UAV is in the hover position, whether to resume the flight path or to land the UAV based on a determination of continued presence of the aircraft in the vicinity of the UAV. The method also includes controlling the UAV based on the determination of whether to resume the flight path or to land the UAV.

19 Claims, 13 Drawing Sheets

(51) Int. Cl.
   *G08G 5/55*   (2025.01)
   *G08G 5/57*   (2025.01)
   *G08G 5/59*   (2025.01)
   *G08G 5/72*   (2025.01)
   *G08G 5/80*   (2025.01)

(52) U.S. Cl.
   CPC ............... *G08G 5/59* (2025.01); *G08G 5/723* (2025.01); *G08G 5/727* (2025.01); *G08G 5/80* (2025.01)

(56) References Cited

U.S. PATENT DOCUMENTS

| | | | |
|---|---|---|---|
| 2015/0197335 A1* | 7/2015 | Dekel | B64U 30/10 |
| | | | 701/5 |
| 2017/0076616 A1* | 3/2017 | Kanade | G06V 10/454 |
| 2017/0372624 A1* | 12/2017 | Surcouf | H04B 7/0413 |
| 2018/0017973 A1* | 1/2018 | Teague | G05D 1/0088 |
| 2018/0068567 A1* | 3/2018 | Gong | H04W 4/022 |
| 2018/0275654 A1* | 9/2018 | Merz | G01S 13/933 |
| 2019/0317530 A1* | 10/2019 | Yang | G08G 5/74 |
| 2020/0166956 A1* | 5/2020 | Stoschek | G01S 7/4802 |
| 2021/0141373 A1* | 5/2021 | Bash | G08G 5/55 |
| 2021/0291982 A1* | 9/2021 | Tan | G08G 5/55 |
| 2021/0325886 A1* | 10/2021 | Li | G06T 7/62 |
| 2023/0098173 A1* | 3/2023 | Ali | G08G 5/56 |
| | | | 701/120 |
| 2024/0118710 A1* | 4/2024 | Stein | B64C 39/024 |

* cited by examiner

UAV FLIGHT CONTROL OPERATIONS FOR PREDICTED TRAFFIC ENCOUNTER

BACKGROUND

An uncrewed vehicle, which may also be referred to as an autonomous vehicle, is a vehicle capable of travel without a physically-present human operator. An uncrewed vehicle may operate in a remote-control mode, in an autonomous mode, or in a partially autonomous mode.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter UAVs, among others. uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

Examples disclosed herein include methods for increasing an expected separation from an aircraft encountered during flight along a flight path. An uncrewed aerial vehicle (UAV) flying along the flight path may receive an indication of another aircraft in a vicinity of the UAV. Based on the received indication, the UAV may decelerate to reduce groundspeed. After reducing groundspeed, the UAV may descend to a hover position. While in the hover position, a determination may be made whether to resume the flight path or to land the UAV. The determination may be based on a determination of continued presence of the aircraft in the vicinity of the UAV. The UAV may be controlled based on the determination of whether to resume the flight path or to land the UAV.

In a first aspect, a method includes receiving an indication of presence of an aircraft in a vicinity of a UAV which is flying along a flight path. The method also includes, based on the received indication, decelerating the UAV to reduce a ground speed along the flight path. The method further includes, after reducing the ground speed, descending the UAV to a hover position. The method additionally includes, while the UAV is in the hover position, determining whether to resume the flight path or to land the UAV based on a determination of continued presence of the aircraft in the vicinity of the UAV. The method also includes controlling the UAV based on the determination of whether to resume the flight path or to land the UAV.

In a second aspect, a UAV comprises a control system. The control system is configured to receive an indication of presence of an aircraft in a vicinity of an uncrewed aerial vehicle (UAV) which is flying along a flight path. The control system is also configured to, based on the received indication, decelerate the UAV to reduce ground speed along the flight path. The control system is further configured to, after reducing the ground speed, descend the UAV to a hover position. The control system is additionally configured to, while the UAV is in the hover position, determine whether to resume the flight path or to land the UAV based on a determination of continued presence of the aircraft in the vicinity of the UAV. The control system is also configured to control the UAV based on the determination of whether to resume the flight path or to land the UAV.

In a third aspect, a non-transitory computer readable medium comprises program instructions executable by one or more processors to perform operations comprising receiving an indication of presence of an aircraft in a vicinity of a UAV which is flying along a flight path. The operations also include, based on the received indication, decelerating the UAV to reduce ground speed along the flight path. The operations further include, after reducing the ground speed, descending the UAV to a hover position. The operations additionally include, while the UAV is in the hover position, determining whether to resume the flight path or to land the UAV based on a determination of continued presence of the aircraft in the vicinity of the UAV. The operations also include controlling the UAV based on the determination of whether to resume the flight path or to land the UAV.

In a further aspect, a system includes means for receiving an indication of presence of an aircraft in a vicinity of a UAV which is flying along a flight path. The system further includes means for decelerating, based on the received indication, the UAV to reduce a ground speed along the flight path. The system also includes means for descending, after reducing the ground speed, the UAV to a hover position. The system additionally includes means for determining, while the UAV is in the hover position, whether to resume the flight path or to land the UAV based on a determination of continued presence of the aircraft in the vicinity of the UAV. The system also includes means for controlling the UAV based on the determination of whether to resume the flight path or to land the UAV.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
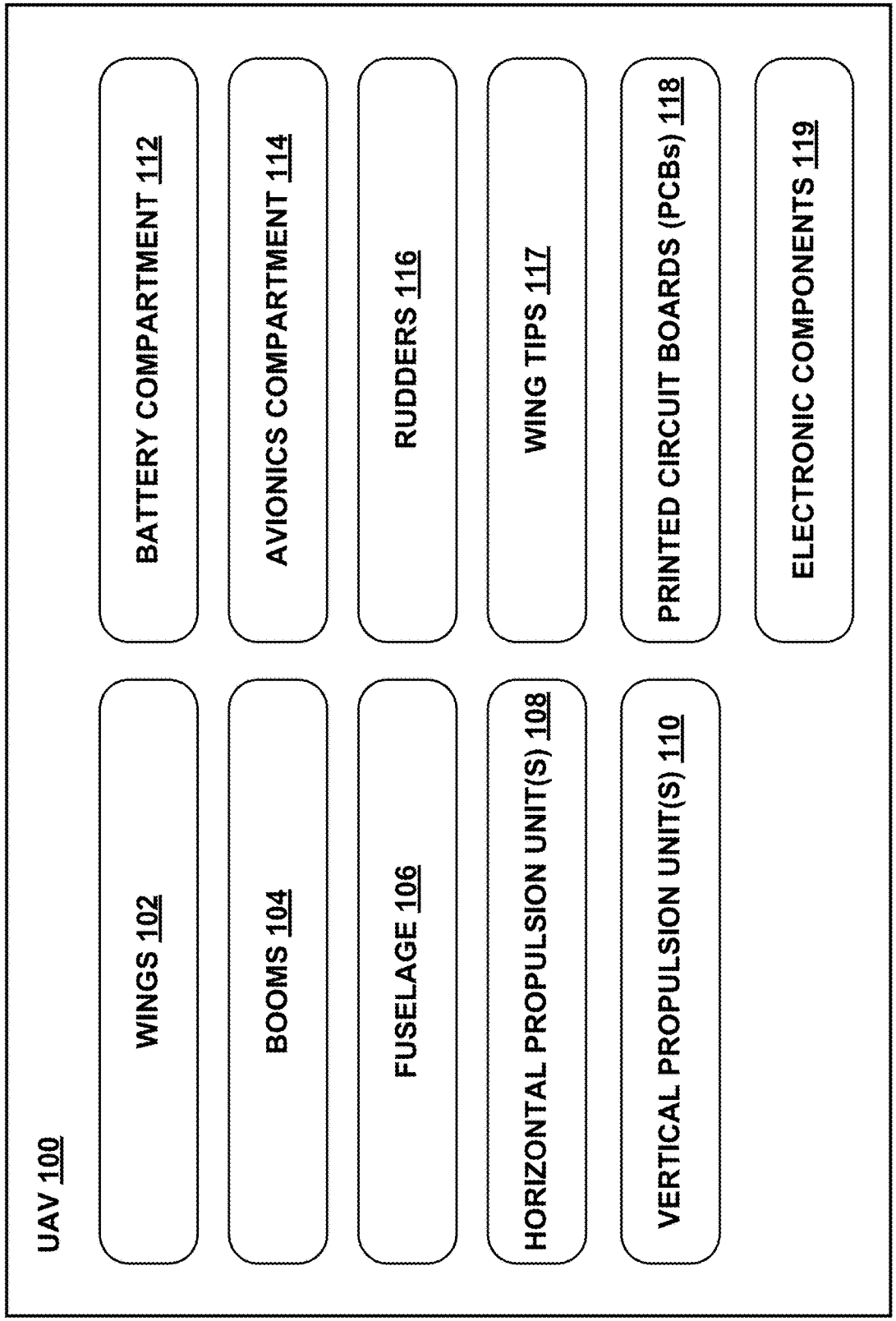
FIG. 1A is a simplified illustration of an uncrewed aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

An example usage of UAVs may be to deliver various items to customers. For example, a UAV may be tasked with picking up a payload containing an item from a location and delivering the payload to a customer's residence, commercial building, or other location. One potential problem that might arise in this delivery process is the UAV may encounter another aircraft (e.g., a crewed aircraft or another uncrewed aircraft) operating in the same vicinity as the UAV flying along a flight path. Operating in close proximity with the aircraft may create a risk of collision between the other aircraft and the UAV. Collision between the UAV and the aircraft may present a safety risk, as well as potentially damaging the UAV and/or the aircraft. Further, landing the UAV to avoid each encounter may be unnecessary in some instances and/or potentially damage the UAV if the landing occurs on unsuitable terrain.

Therefore, it may be desirable to increase an expected distance of separation between the UAV and the aircraft to reduce the likelihood of a collision while avoiding unnecessary contingency landings. For example, when an unacceptably close encounter with an aircraft is established, the UAV could utilize a decision logic to increase the distance of separation between the UAV and the aircraft.

Provided herein are methods for increasing the distance of separation between the UAV and the aircraft operating in the vicinity of the UAV while minimizing unnecessary landings. In some examples, the UAV may be traveling at cruising speed along the flight path when the UAV receives an indication of another aircraft operating within the vicinity of the UAV. It may be determined that the scenario creates an unacceptable risk of the UAV encountering the aircraft. In response to that determination, the UAV may decelerate from the cruising speed to a zero horizontal speed. If the aircraft operating within the vicinity still creates a risk of encounter, the UAV may begin a descent toward the ground. In some examples, the UAV may begin the descent when the horizontal speed has been reduced below a threshold ground speed. The UAV may stop the descent toward the ground at a hover position when a minimum height above ground level (AGL) has been reached. When the UAV stops descending, for example by reaching the minimum height AGL, a timer may be started. The timer may count up to a threshold time by which the UAV must determine whether to resume travel along the flight path. When the threshold time is reached, the UAV may land and end the mission. If the threshold time has not yet been reached and the aircraft operating in the vicinity no longer creates the unacceptable risk of encounter, the UAV may return to normal flight along the flight path.

In some examples, the UAV may determine for each of several potential actions whether the action may be expected to result in an increased separation from the aircraft. The UAV may only perform an action if the action may be determined to result in the increased separation from the aircraft. However, the UAV may not perform the action if the action is determined not to increase the separation from the aircraft. The determination may be based on a predicted trajectory of the UAV and a predicted trajectory of the aircraft. The predicted trajectory of the UAV may be compared to the predicted trajectory of the aircraft at a series of points in time in order to determine whether the action will likely increase the separation from the aircraft.

II. Example Uncrewed Vehicles

Herein, the terms "uncrewed aerial vehicle" and "UAV" refer to any autonomous or semi-autonomous vehicle that is capable of performing some functions without a physically present human pilot. As would be understood by one of skill in the art, uncrewed and unmanned may be used interchangeably.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), or "uncrewed aerial system" (UAS) may also be used to refer to a UAV.

FIG. 1A is a block diagram of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although UAV 100 in FIG. 1A may include two wings 102, two booms 104, two horizontal propulsion units 108, and six vertical propulsion units 110 per boom 104, it should be appreciated that other variants of UVA 100 may be implemented with more or less of these components. For example, UAV 100 may include four wings 102, four booms 104, and more or less propulsion units (horizontal or vertical).

Figure 1B:
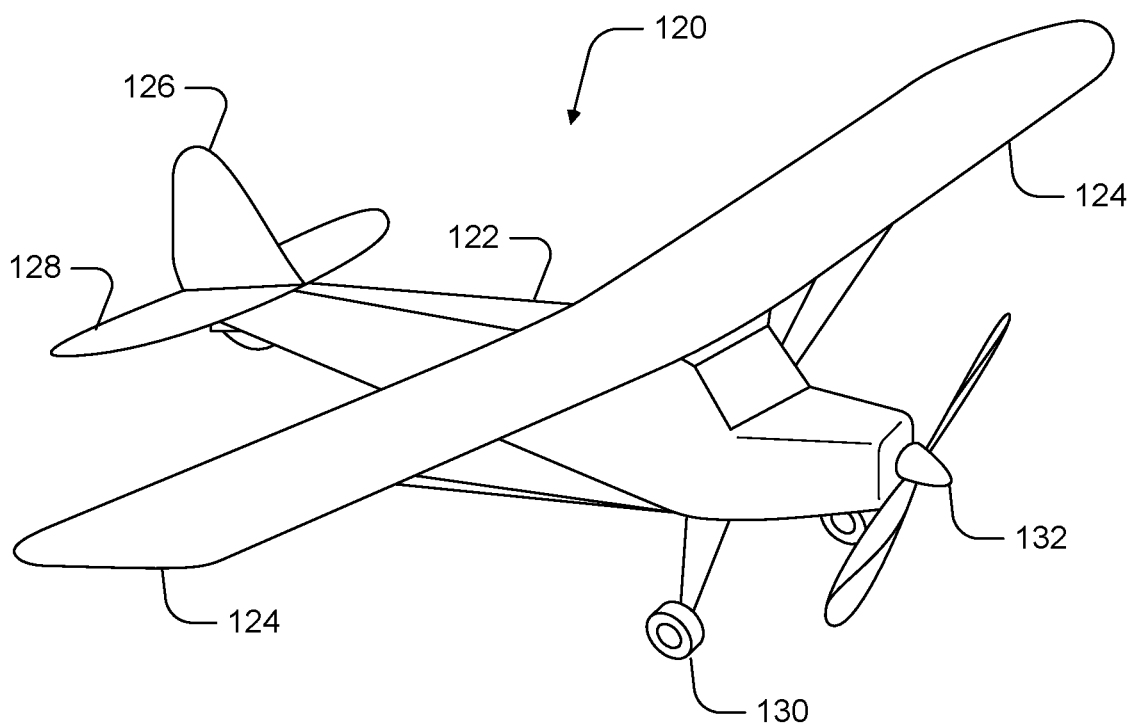
FIG. 1B is a simplified illustration of an uncrewed aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
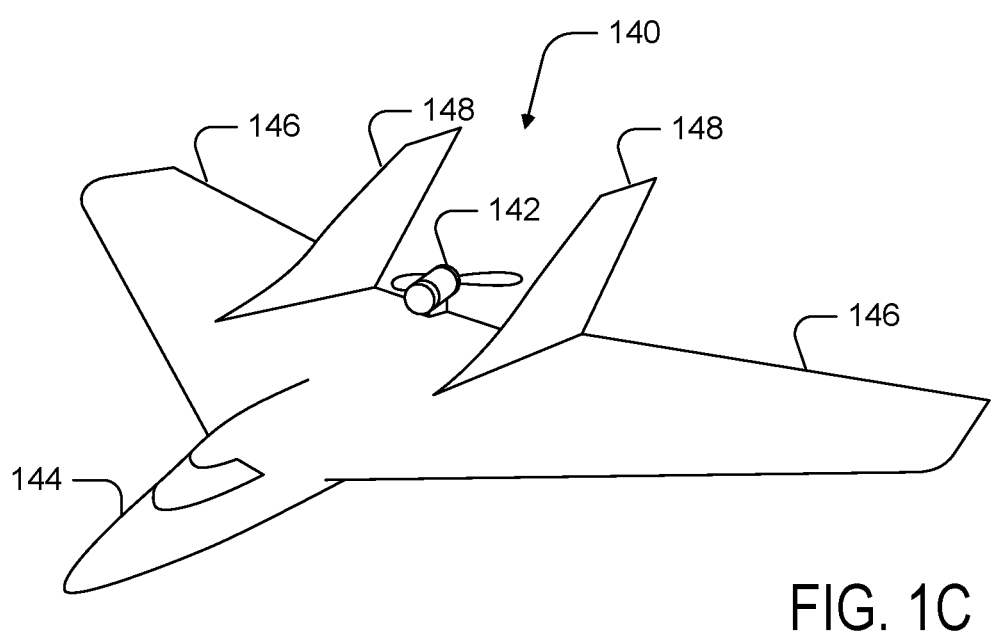
FIG. 1C is a simplified illustration of an uncrewed aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
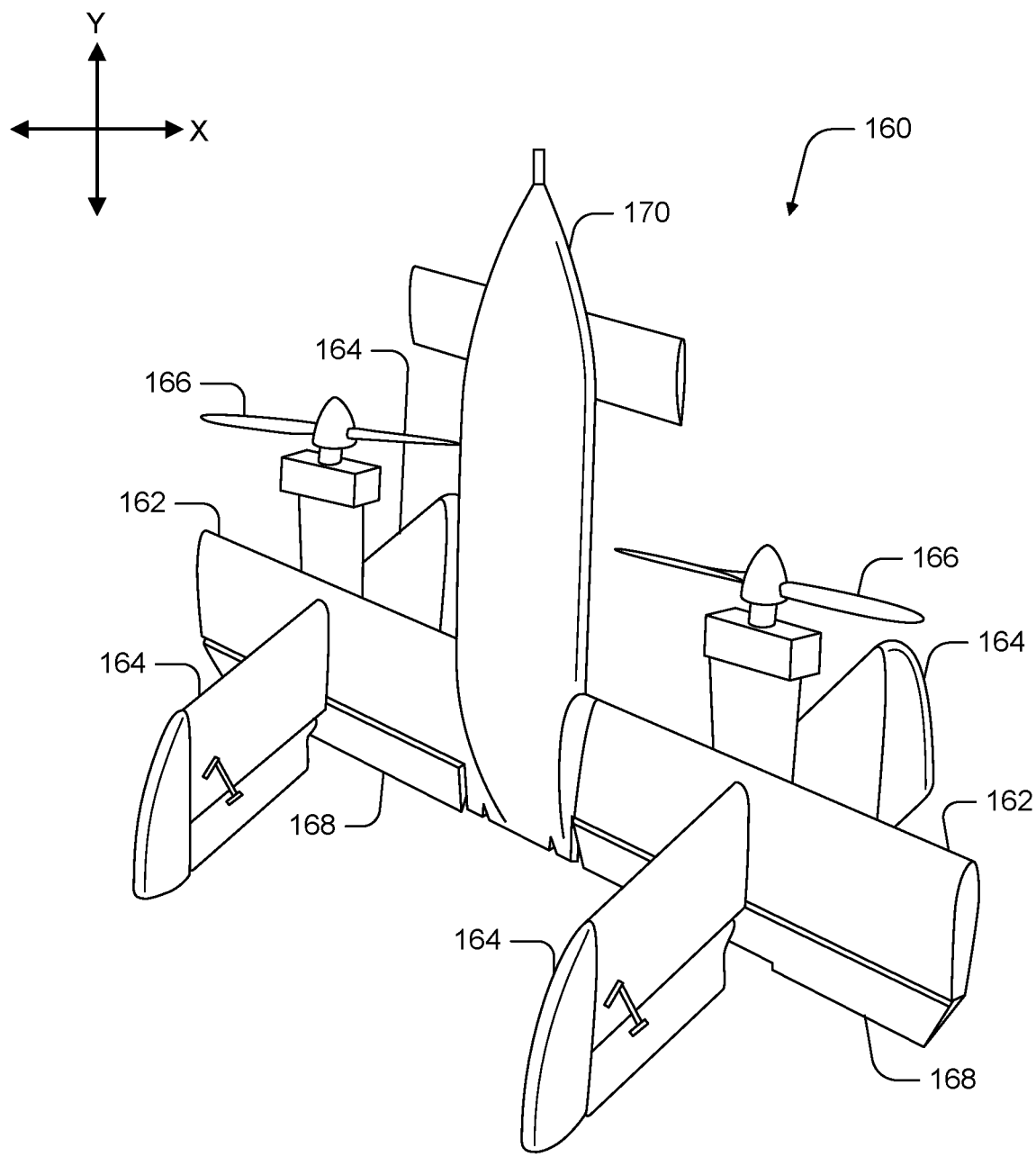
FIG. 1D is a simplified illustration of an uncrewed aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
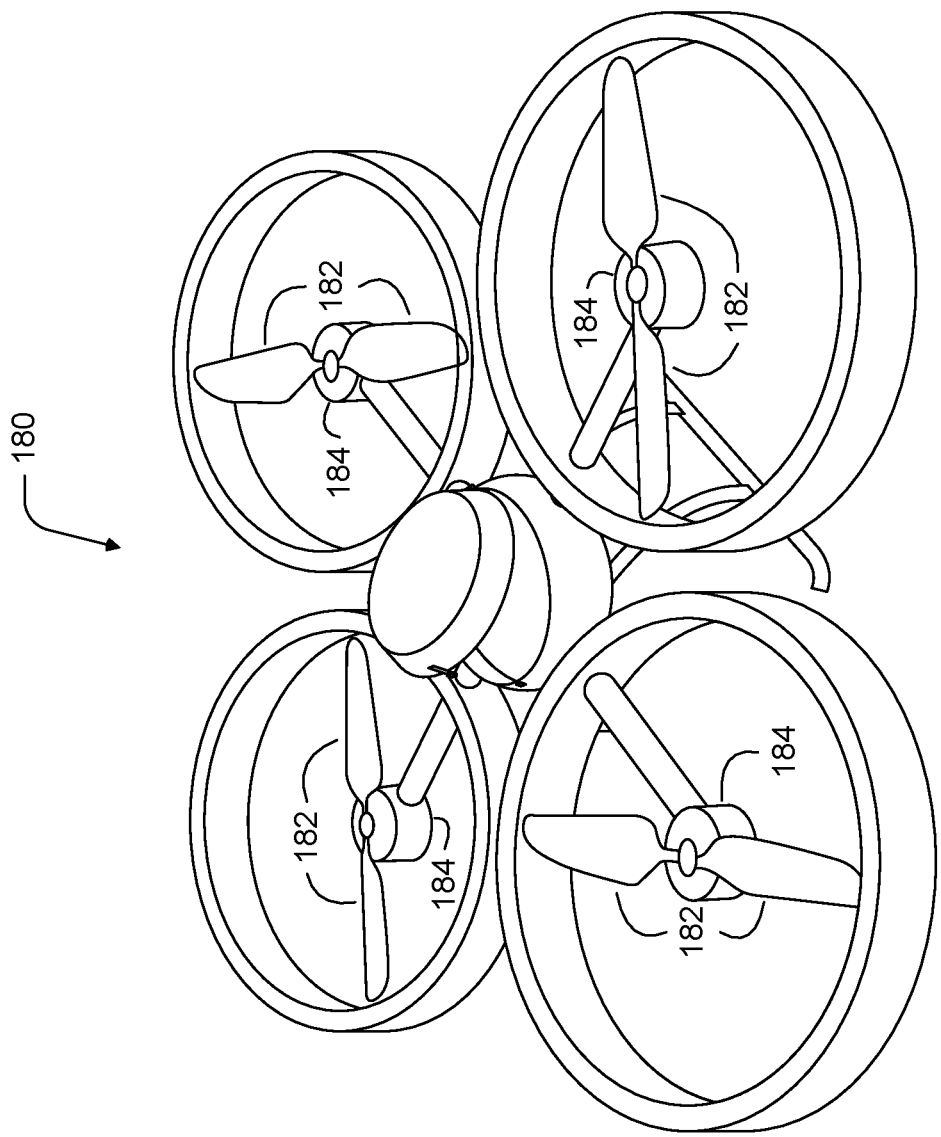
FIG. 1E is a simplified illustration of an uncrewed aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Illustrative UAV Components

Figure 2:
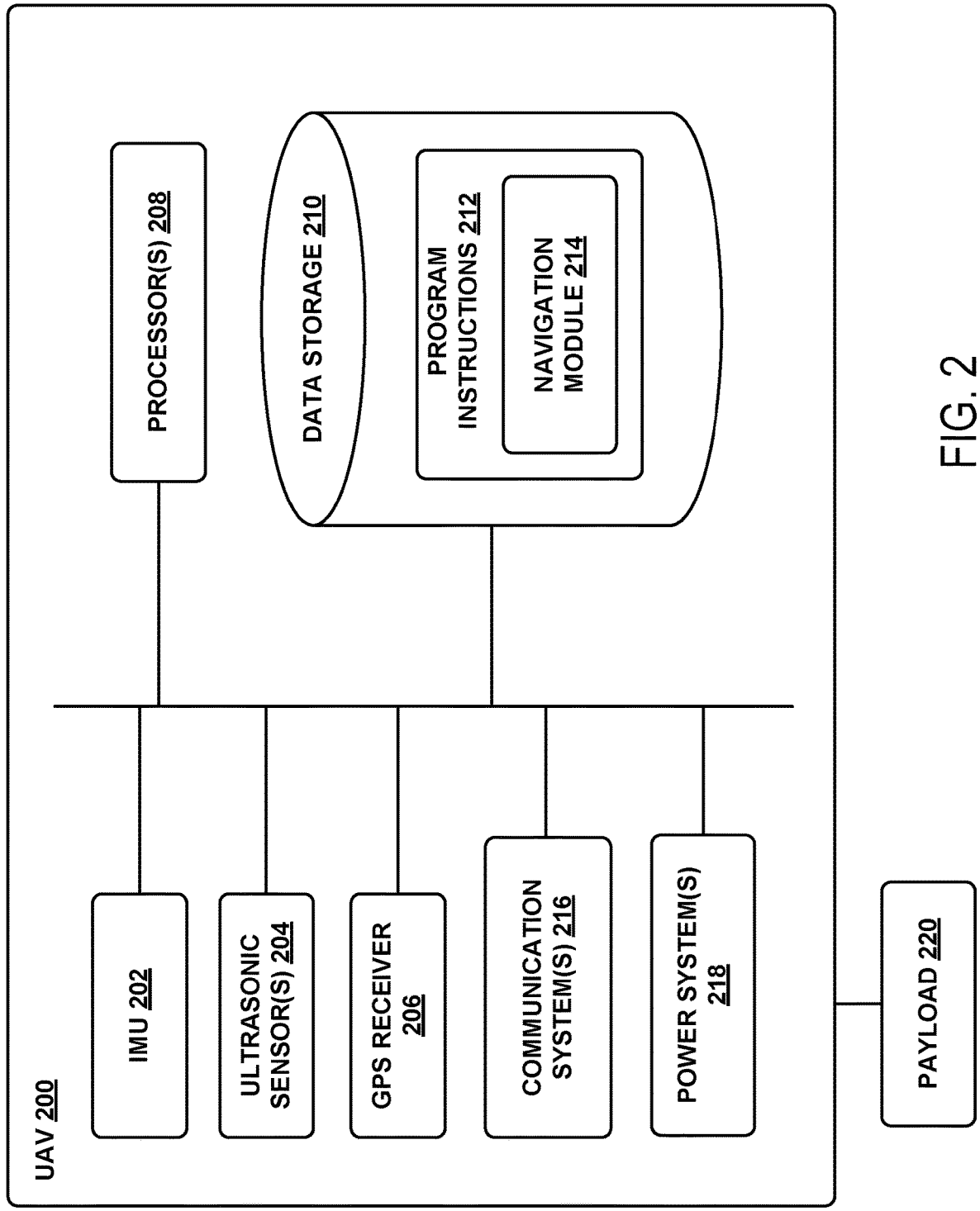
FIG. 2 is a simplified block diagram illustrating components of an uncrewed aerial vehicle, in accordance with example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
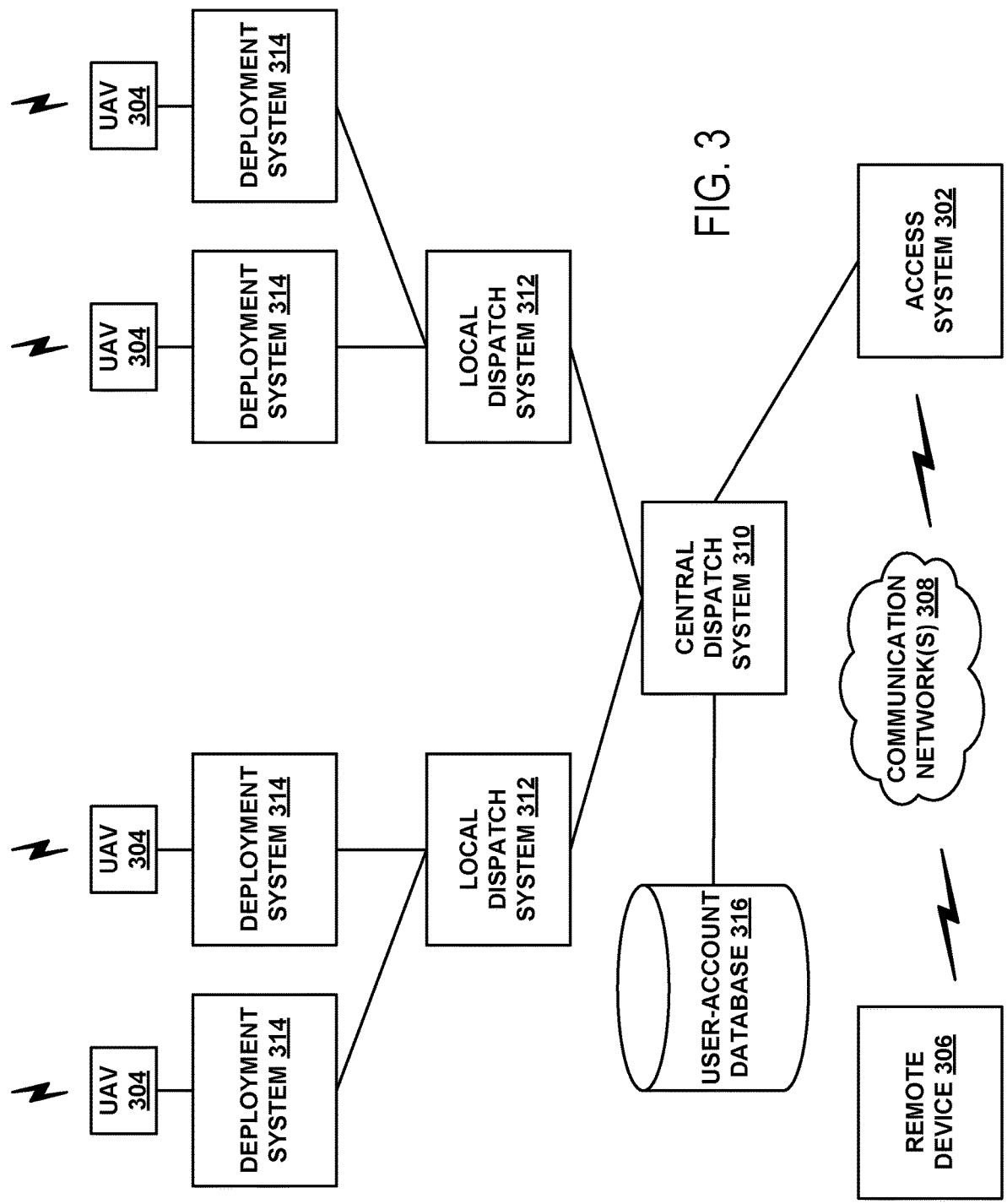
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Illustrative UAV Avoidance Maneuvers

Figure 4:
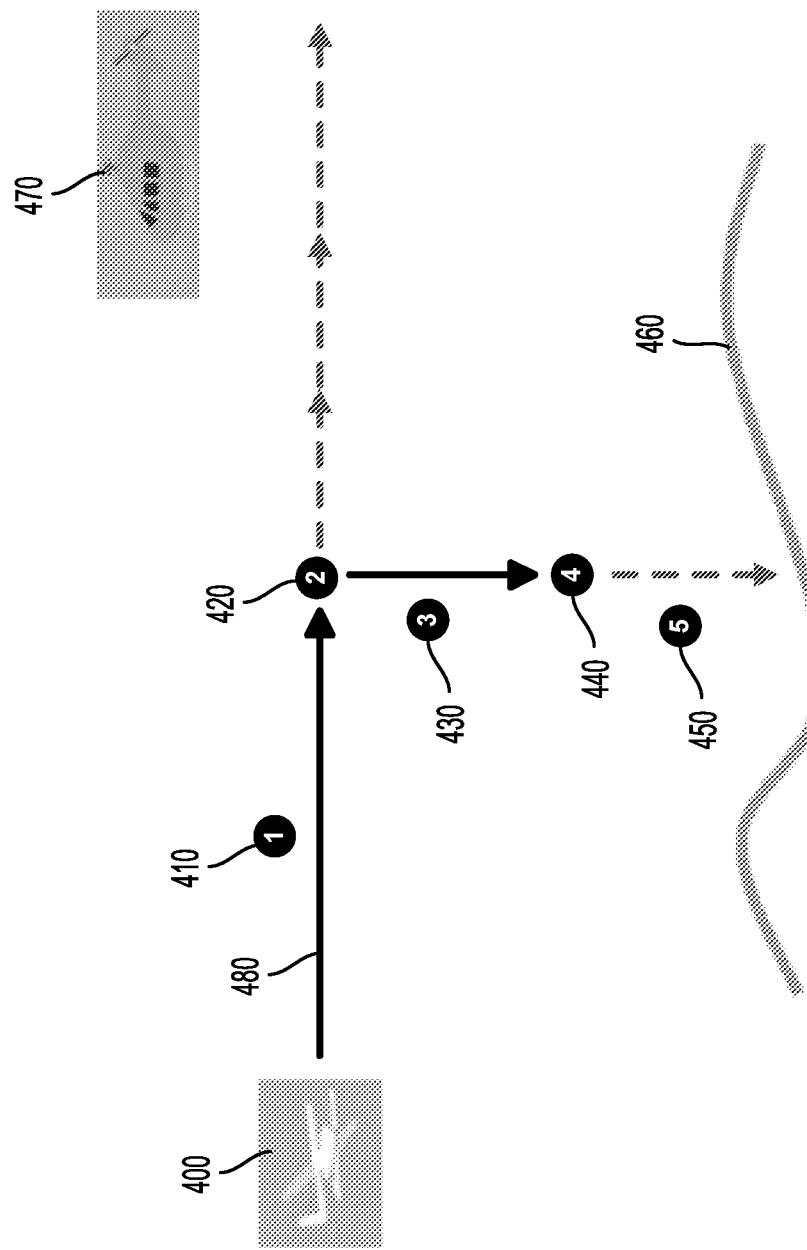
FIG. 4 is an illustration of flight control operations performed by a UAV traveling along a flight path, in accordance with example embodiments.

FIG. 4 illustrates flight control operations performed by UAV 400 traveling along a flight path 480, in accordance with example embodiments. The operations performed by the UAV 400 may include a deceleration maneuver 410 from the flight path 480 to a descent point 420, a descent 430 from the flight path 480, a hovering position 440, and a determination to land 450 the UAV 400.

The UAV 400 may initially travel along the flight path 480. In some examples, the flight path 480 may be at steady level flight (e.g., cruise), such as traveling at a first horizontal velocity and a first altitude. However, in other examples the flight path 480 may include a turn, a climb, and/or a descent. As the UAV 400 travels along the flight path 480, the UAV 400 may receive an indication of the presence of an aircraft (e.g., an intruder), such as aircraft 470, that may be in a vicinity of the UAV 400. The received indication may be a potential traffic conflict that may occur between the UAV 400 and another vehicle, such as the aircraft 470. The potential traffic conflict may be undesirable and/or pose unsafe conditions for either the UAV 400 and/or the aircraft 470, such as a risk of collision. Thus, the UAV 400 may seek to increase a distance of separation between the UAV 400 and the aircraft 470.

Based on the received indication of the presence of the aircraft, the UAV 400 may begin the deceleration maneuver 410. The UAV 400 may perform the deceleration maneuver 410 based on a determination that deceleration may be expected to improve separation between the UAV 400 and the aircraft 470 at a closest point of approach. The UAV 400 may decelerate horizontal velocity along the flight path 480 until the UAV 400 is traveling at a second horizontal velocity. The second horizontal velocity may be less than the first, initial horizontal velocity. In some examples, the second horizontal velocity may be zero meters/second (m/s) (e.g., completely stopped); however, in other examples the second horizontal velocity may be greater than zero, such as 5 m/s. Horizontal velocity may be referred to herein as groundspeed. While the UAV 400 reduces groundspeed during deceleration, the UAV 400 may still produce lift which may allow the UAV 400 to maintain the altitude of the flight path 480. Thus, at zero groundspeed the UAV 400 may hover at a point along the flight path 480. Within examples, the rate of deceleration may depend on the first and/or second horizontal velocity and/or the proximity of the UAV 400 to the aircraft 470. For example, where the UAV 400 is traveling at a high first horizontal velocity and/or the aircraft 470 may be in close proximity, it may be desirable to rapidly decelerate the UAV 400 horizontal velocity.

In some examples, the determination to perform the deceleration maneuver 410 may be based on a position of the aircraft 470 relative to the UAV 400. For example, decelerating the UAV 400 to reduce groundspeed along the flight path 480 may be based on a determination that the aircraft 470 is not below the UAV 400. When the aircraft 470 is below the UAV 400, deceleration may pose an increased risk of collision creating safety concerns for the UAV 400 and/or the aircraft 470. Thus, determining whether the aircraft 470 is below the UAV 400 and decelerating only if it is determined that the aircraft 470 is not below the UAV 400 may increase overall flight safety.

Within examples, it may be determined that separation between the UAV 400 and the aircraft 470 may be improved by changing the altitude of the UAV 400. For example, the separation between the UAV 400 and the aircraft 470 may be improved by descending the UAV 400 to an altitude less than the flight path 480. The descent point 420 may be a point at which a determination may be made for the UAV 400 to either continue along the flight path 480 or descend from the flight path 480. The descent point 420 may be reached when the UAV 400 decelerates to the second horizontal velocity. In some examples, the UAV 400 may begin descent 430 from descent point 420 to the hover position 440 once the groundspeed of the UAV 400 is reduced below a threshold groundspeed. Because the descent point 420 may be reached when the UAV 400 reaches the second horizontal velocity, the descent point may be zero or non-zero groundspeed in different examples. In the example shown in FIG. 4, the descent point 420 is zero groundspeed. Descent from the flight path 480 at certain velocities may cause an undesirable production of lift on the UAV 400 which may cause the UAV 400 to pitch upwards. In some examples, the second horizontal velocity may allow for descent from the descent point 420 without causing pitching of the UAV 400. Thus, in examples, the threshold groundspeed, corresponding to the descent point 420, may be a point at which the UAV 400 may be able to descend without generating sufficient lift for a pitching up condition.

In some examples, the determination to begin descent 430 from the flight path 480 may be based on a position of the aircraft 470 relative to the UAV 400. For example, descending the UAV 400 to the hover position may be based on a determination that the aircraft 470 is not below the UAV 400. When the aircraft 470 is below the UAV 400, descending the UAV 400 may pose an increased risk of collision creating safety concerns for the UAV 400 and/or the aircraft 470. Thus, determining whether the aircraft 470 is below the UAV 400 and descending to the hover position 440 only if it is determined that the aircraft 470 is not below the UAV 400 may increase overall flight safety. The position of the aircraft 470 relative to the UAV 400 may therefore be considered when determining to proceed with the deceleration maneuver 410, the descent 430, and/or both.

Within examples, the UAV 400 may include onboard sensors, such as optical sensors, positioned on an underside of the UAV 400. The sensors may capture sensor data representative of the area below the UAV 400 which may be used to determine whether the aircraft 470 is below the UAV 400. In other examples, the determination that the aircraft 470 is not below the UAV 400 may be based on data gathered from ground based sensors. The ground based sensors may determine an altitude at which the aircraft 470 is flying. The altitude of the aircraft 470 may be compared to the altitude of the UAV 400 to determine whether the aircraft 470 is below the UAV 400. When the aircraft 470 is operating at an altitude below the UAV 400, it may be determined that descent may not increase separation between the UAV 400 and the aircraft 470 and thus a descent maneuver may not be performed.

The UAV 400 may begin descent 430 from the flight path 480. A trajectory of the descent 430 may vary based on the second horizontal velocity of the UAV 400 at the descent point 420. For example, when the UAV 400 descends at zero groundspeed the descent 430 may be substantially vertical (e.g., straight down). However, in other examples the UAV 400 may begin to descend at a non-zero groundspeed, where the trajectory of the descent 430 may be parabolic. During the descent 430, the UAV 400 may descend from the first altitude to a second altitude. The second altitude may be less than the first altitude. Within examples, the second altitude may be determined by sensors onboard the UAV 400. For example, an above ground level (AGL) estimation may be determined from data captured by the sensors onboard the UAV 400. The AGL estimation may be used to determine the second altitude to which the UAV 400 may. Due to the potential occurrence of natural and/or manmade structures below the flight path 480, the second altitude may be greater than (e.g., above) a minimum height AGL (e.g., an AGL floor). In some examples, the second altitude may be at least partially based on a determination that obstacles are below the descent point 420. For example, the sensors may determine that a tree is below the UAV 400 at the descent point 420. In response, the second altitude may be set above the tree allowing the UAV 400 to descend 430 to the second altitude without contacting the tree. Within examples, during any point of the descent 430, a determination may be made for the UAV 400 to resume travel along the flight path 480. The determination for the UAV 400 to resume the flight path 480 may be based on a received indication that the aircraft 470 no longer presents a traffic conflict. If a decision is not made to resume the flight path 480, the UAV 400 may descend to the hover position 440.

In some examples, the second altitude to which the UAV 400 descends may be the hover position 440. The UAV 400 may stay at the hover position 440 until the traffic conflict with the aircraft 470 has cleared. While the UAV 400 is in the hover position 440, the UAV 400 may determine whether to resume the flight path 480 or to land the UAV 400 based on a determination of continued presence of the aircraft 470 in the vicinity of the UAV 400. Within examples, a timer, such as a persistence timer, may be initiated when the UAV 400 reaches the hover position 440. In some examples, the timer may be a countdown timer. The timer may include a set amount of time in which a determination must be made whether to resume the flight path 480 or to land the UAV 400. In some examples the set amount of time may be predetermined and fixed, while in other examples the set amount of time may vary on a case-by-case basis. For example, the set amount of time of the persistence timer may be based on a remaining energy level of at least one battery of the UAV 400 and/or a remaining energy requirement of the UAV 400 along the flight path 480. Total UAV weight, flight path distance, maneuvers performed, and/or weather conditions may impact the energy consumption and/or the energy requirement of the UAV 400. For instance, a heavily loaded UAV and/or a longer flight path may require more energy from the battery to complete the mission. Similarly, more energy may be required during a strong headwind weather condition. In examples, the UAV 400 may consume extra energy to perform a maneuver, such as a deceleration and/or descent maneuver in response to the traffic conflict. This may reduce the set time that the UAV 400 is capable of maintaining the hover position 440 to wait for the traffic conflict to clear because the UAV 400 may still require sufficient energy for completion of the mission. Thus, by basing the set amount of time of the persistence timer on the remaining energy requirement of the UAV 400 and/or the remaining energy level of the at least one battery, the UAV 400 may mitigate completely depleting energy en route.

In other examples, the persistence timer may be based on a time remaining on a planner-reserved flight volume. For instance, the time remaining on the planner-reserved flight volume may expire while the UAV 400 is waiting for the traffic conflict to clear. A determination may be made to land the UAV 400 when the time remaining on the planner-reserved flight volume expires while the UAV 400 is waiting for the traffic conflict to clear. In other examples, the traffic conflict may be cleared before the time remaining on the planner-reserved flight volume expires. A determination may be made for the UAV 400 to resume travel along the flight path 480. Thus, the time on the persistence timer in which the determination to land the UAV 400 or resume travel along the flight path 480 may be non-constant and vary on a case-by-case basis.

In examples, the determination for the UAV 400 to resume the flight path 480 may be based on an indication that a traffic conflict is no longer present. For example, it may be determined by either a ground based traffic monitor and/or the UAV 400 that the aircraft 470 is no longer in the vicinity of the UAV 400, thus no longer posing a potential risk, which may allow the UAV 400 to resume travel along the flight path 480. To resume travel along the flight path 480 the UAV 400 may begin to ascend (e.g., climb) along the same or substantially same path of descent 430. Within examples, the UAV 400 may ascend, to recover vertical distance lost from a previous descent, until a vertical distance from the flight path 480 is reduced to (e.g., within) an acceptable level, at which point the UAV 400 may begin to increase horizontal velocity until the cruise speed is reached. The UAV 400 may ascend vertically the same amount as the previous descent to return to the flight path 480. In some examples, the reduced descent depth may be the descent point 420. However, in other examples the reduced descent depth at which the UAV 400 may accelerate to cruise speed may be a height AGL less than the descent point 420. Thus, the reduced descent depth at which the UAV 400 may begin acceleration to cruise speed may be anywhere between the hover position 440 and the descent point 420, up to and/or including the descent point 420. In some examples, the UAV 400 may begin acceleration to cruise speed (e.g., increasing groundspeed) while continuing to ascend (e.g., climb) to the flight path 480. Thus, a trajectory of the UAV 400 resuming the flight path 480 may be a straight vertical trajectory in some examples, while in other examples the trajectory may be parabolic.

In some examples, a determination may be made to land 450 the UAV 400 on the ground 460. For example, the determination to land 450 the UAV 400 may be made based on the continued presence of the aircraft 470 in the vicinity of the UAV 400 at the expiration of the set amount of time on the timer. Within examples, if the determination is made to land the UAV 400 a descent control system may be used to land the UAV 400. The descent control system may be based on a downward facing sensor on the UAV 400. The downward facing sensor may be the sensor positioned on the underside of the UAV 400, for example. The downward facing sensor (e.g., a camera) on the UAV 400 may assist in landing the UAV 400 by capturing information about landing conditions of the ground 460. For example, the downward facing sensor may capture information indicative of whether it may be safe for the UAV 400 to begin landing in a substantially vertical descent or whether potential obstacles exist directly below the UAV 400, indicating an unsafe landing area, that may require obstacle avoidance. Such potential obstacles that may require obstacle avoidance may be, but are not limited to, a power line, a tree, a road, a building, and/or any other natural or manmade structure. Thus, the captured information may be used in evaluating to determine a safe location to land. In some examples, the descent control system may use the captured information from the downward facing sensor to navigate an acceptable landing path. Within examples, after the UAV 400 begins the landing sequence, the UAV 400 may not attempt to resume flight along the flight path 480. After the UAV 400 has landed, the UAV 400 may reside on the ground 460 until it may be recovered by personnel, and the UAV 400 may not attempt to take-off after landing. By committing to landing and/or not attempting to take-off after landing, the UAV 400 may reduce the occurrence of colliding with obstacles on ascent, such as when the UAV 400 must navigate on a non-linear landing pattern during landing.

Figure 5:
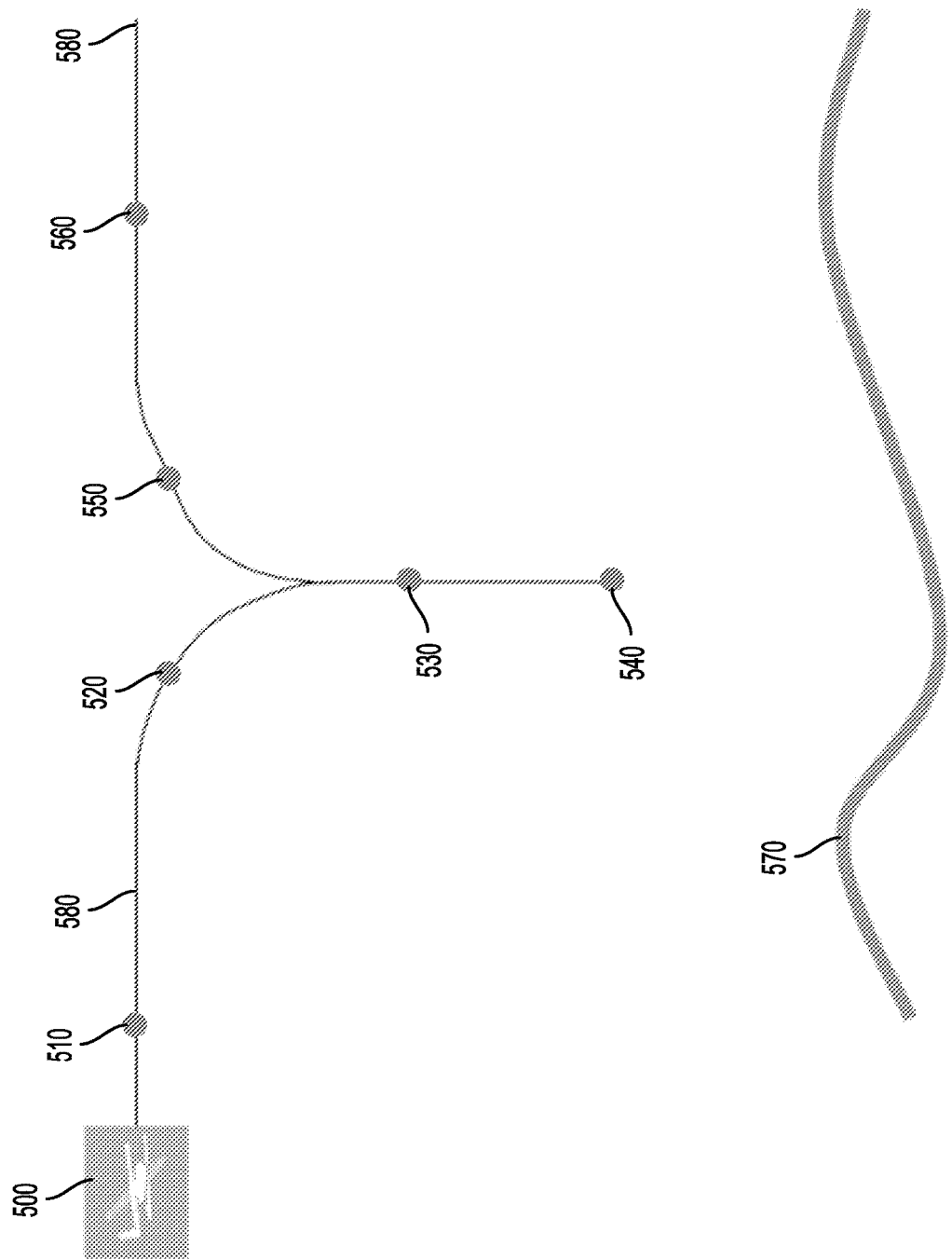
FIG. 5 is a further illustration of flight control operations performed by a UAV traveling along a flight path, in accordance with example embodiments.

FIG. 5 illustrates flight control operations performed by UAV 500 traveling along a flight path 580, in accordance with example embodiments. The operations performed by the UAV 500 may include decelerating 510 from the flight path 580 to a descent point 520, a descent/ascent route 530, a hovering position 540 above a ground level 570, and an acceleration point 550 to return to a cruise speed 560.

FIG. 5 illustrates an example maneuver of the UAV 500. The UAV 500 may have the same and/or similar capabilities as the UAV 400 described with respect to FIG. 4. In the example shown, the UAV 500 may be traveling along the flight path 580 when an indication is received that an aircraft may be in the vicinity of the UAV 500. It may be desirable to avoid collision with the aircraft and/or to increase a distance of separation from the aircraft. Based on the received indication, the UAV 500 may begin decelerating 510 to reduce groundspeed. In some examples, the UAV 500 may decelerate at a rate of 4 meters per second squared (m/s^2). An acceptable velocity for descent may be reached while the UAV 500 continues decelerating 510 groundspeed. The acceptable velocity may be a velocity at which the UAV 500 may begin safely descending from the flight path. In one example, the acceptable velocity may be a groundspeed equal to or below 15 m/s. The acceptable velocity may allow the UAV 500 to descend without generating excessive lift on the UAV 500. In some examples, the descent point 520 may be reached once the UAV 500 has decelerated to the acceptable velocity.

At the descent point 520 the UAV 500 may begin descending from the flight path 580 while continuing deceleration. This may be shown by the curved descent trajectory at the descent point 520 in FIG. 5. The UAV 500 may continue decelerating 510 until groundspeed has been reduced to zero m/s. At zero m/s groundspeed the UAV 500 may descend along the descent/ascent route 530 at a substantially vertical trajectory until a minimum height AGL is reached. In one example, the minimum height AGL may be 22 meters; however, in other examples the minimum height AGL may be another height. In some examples, the UAV 500 may halt descent based on an indication that the height AGL is below a threshold. At the minimum height AGL the UAV 500 may cease descent along the descent/ascent route 530 and maintain the hover position 540. If a determination is made to resume the flight path 580 the UAV 500 may begin a substantially vertical ascent along the descent/ascent route 530. In some examples, the UAV 500 may begin accelerating to increase groundspeed while continuing ascending to the flight path 580. This may be shown by the curved ascent trajectory at the acceleration point 550 in FIG. 5. For example, the UAV 500 may begin increasing groundspeed once the UAV 500 has ascended from the hover position 540 to a distance below the flight path 580. In one example, the UAV 500 may begin increasing groundspeed when the UAV 500 has ascended to a position vertically within 10 meters of the flight path 580. However, in other examples the UAV 500 may begin increasing groundspeed at any vertical distance between the hover position 540 and the flight path 580. The point at which the UAV 500 begins increasing groundspeed during vertical ascent may be the acceleration point 550. Within examples, the UAV 500 may continue ascent until reaching the flight path 580. The UAV 500 may continue accelerating groundspeed until reaching a desired cruise speed, at which point the UAV 500 may continue along the flight path 580 at the cruise speed.

Figure 6:
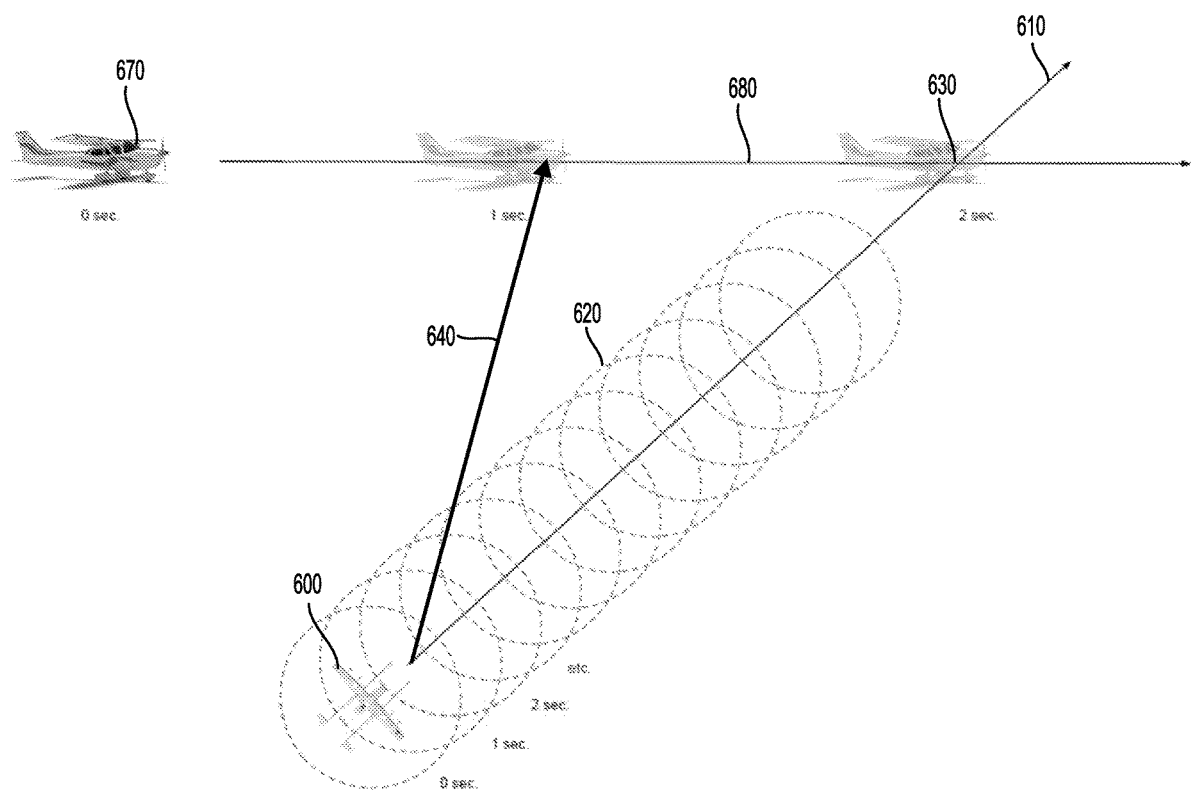
FIG. 6 is an illustration of a predicted traffic encounter between a UAV and an aircraft, in accordance with example embodiments.

FIG. 6 illustrates a predicted traffic encounter between a UAV 600 and an aircraft 670, in accordance with example embodiments. As shown, the UAV 600 may be traveling along a flight path 610 when an indication is received that the aircraft 670 may be in a vicinity of the UAV 600. A predicted trajectory 680 of the aircraft 670 may be determined to cross with the flight path 610 of the UAV 600 at a point of intersection 630. Distance of the aircraft 670 from the UAV 600 may be determined at future points in time by comparing the future positions of the aircraft 670 along the predicted trajectory 680 with future positions of the UAV 600 flying along the flight path 610. The closest predicted distance between the UAV 600 and the aircraft 670 at a future point in time may be considered a closest point of approach 640.

In determining whether the UAV 600 may come unacceptably close to the aircraft 670 at the closest point of approach 640 a three-dimensional (3D) coverage zone 620 may be generated for the UAV 600. The coverage zone 620 may be a threshold distance from the UAV 600. For example, the threshold distance may be a vertical distance and/or a horizontal distance extending in all directions from the UAV 600. In some examples, the coverage zone 620 may be projected along the flight path 610 of the UAV 600. The projected coverage zone 620 may be compared at future points in time to the predicted trajectory 680 of the aircraft 670. Within examples, if the closest point of approach 640 falls within the threshold distance of the coverage zone 620 projected along the flight path 610 then it may be determined that the closest point of approach 640 may create an unacceptable safety risk for the UAV 600 and/or the aircraft 670.

To increase safety at the closest point of approach 640, it may be determined for the UAV 600 to perform an avoidance maneuver, such as the maneuver discussed with respect to FIG. 4.

In some examples, it may be desirable to increase a distance of separation between the UAV 600 and the aircraft 670 at the closest point of approach 640. The UAV 600 may perform a maneuver, such as the maneuver discussed with respect to FIG. 4, to increase the distance of separation. For example, a determination may be made whether the distance of separation between the aircraft 670 and the UAV 600 at the closest point of approach 640 is expected to improve by decelerating the UAV 600 to reduce ground speed or by descending the UAV 600 to the hover position. In such examples, decelerating the UAV 600 may further be based on determining whether the distance of separation between the aircraft 670 and the UAV 600 at the closest point of approach 640 is expected to improve. However, in other examples, the UAV 600 may not decelerate and/or descend if it is determined that the closest point of approach 640 may not be improved by such maneuvers. For instance, the UAV 600 may not decelerate and/or descend when the predicted trajectory 680 of the aircraft 670 is within the coverage zone 620 vertically below the UAV 600 at the closest point of approach 640. By performing the maneuver based on the determination that the maneuver is likely to increase the distance of separation between the UAV 600 and the aircraft 670 at the closest point of approach 640, the likelihood of potential collisions between the UAV 600 and the aircraft 670 may be reduced.

While the coverage zone 620 shown in FIG. 6 has a constant radius (e.g., threshold distance) at future points in time, in other examples the coverage zone 620 may be non-constant. For example, the threshold distance of the coverage zone 620 projected along the flight path 610 may increase at future points in time. The coverage zone 620 projected along the flight path 610 may resemble a cone in some examples. The increasing coverage zone 620 for future points in time may account for unforeseeable changes to the predicted trajectory 680 of the aircraft 670. Increasing the coverage zone 620 further into the future may decrease the likelihood of potential collisions between the aircraft 670 and the UAV 600, thus increasing flight safety.

VI. Illustrative Logic Diagrams

Figure 7:
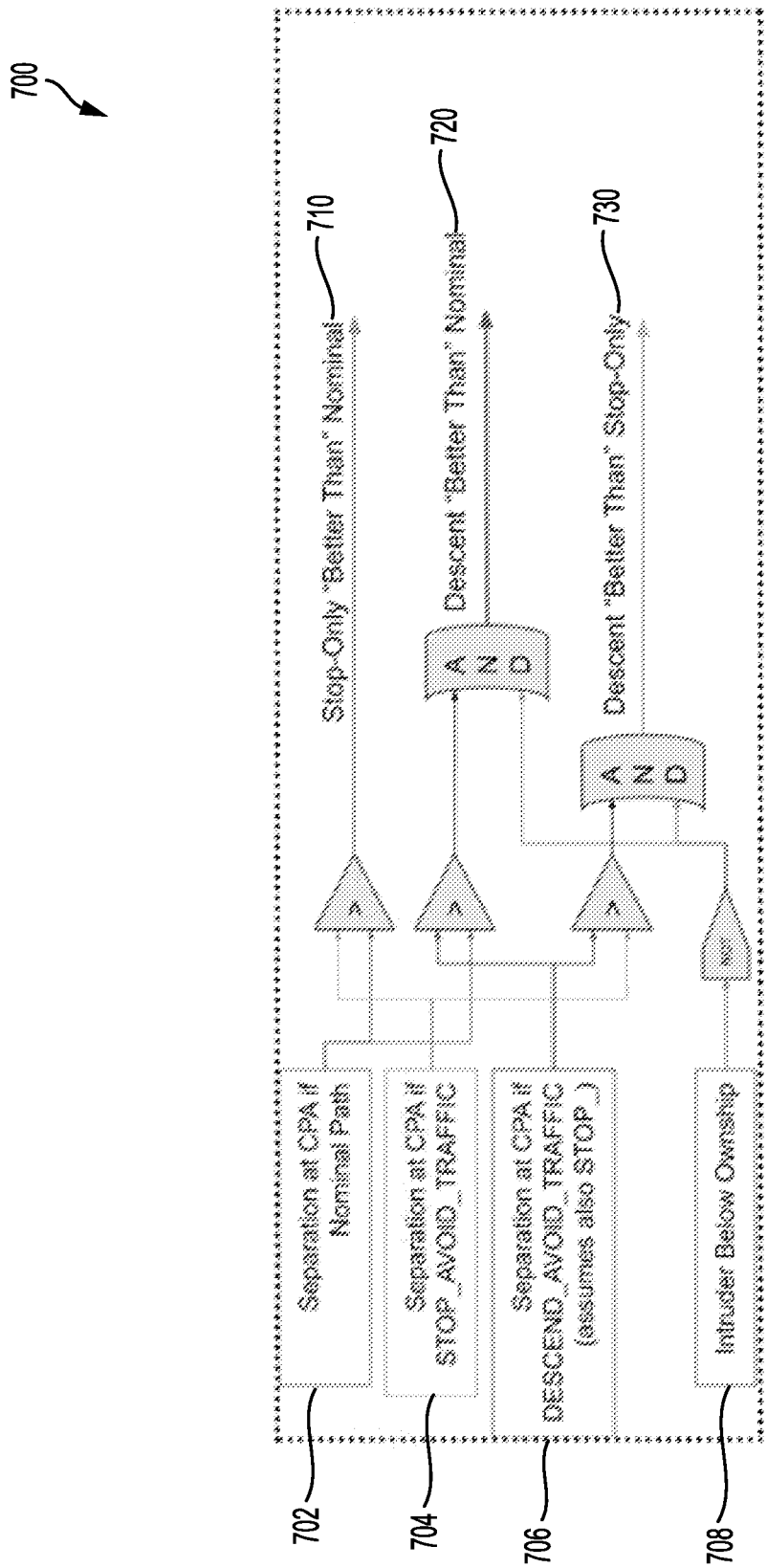
FIG. 7 is a logic diagram showing evaluation of possible maneuvers when a traffic conflict warning is received, in accordance with example embodiments.

FIG. 7 is a logic diagram 700 showing evaluation of possible maneuvers when a traffic conflict warning is received, in accordance with example embodiments. The evaluation may compare a plurality of inputs, such as blocks 702-708, based on an expected separation at the closest point of approach (CPA) of the UAV from the aircraft. Block 702, "Separation at CPA if Nominal Path," refers to the expected distance of separation of the UAV from the aircraft at the CPA if the UAV continues along the flight path. Block 704, "Separation at CPA if STOP_AVOID_TRAFFIC," refers to the expected distance of separation of the UAV from the aircraft at the CPA if the UAV decreases groundspeed to zero m/s while traveling along the flight path. Block 706, "Separation at CPA if DESCEND_AVOID_TRAFFIC (assumes also STOP_)," refers to the expected distance of separation of the UAV from the aircraft at the CPA if the UAV decreases groundspeed to zero m/s and descends to an altitude below the flight path.

The evaluation may compare the blocks 702-706 to determine which maneuver may be expected to result in the largest separation at CPA. In one example, block 702 may be determined to produce the best separation at CPA. For instance, the aircraft may be expected to pass below or behind the UAV traveling along the flight path, allowing the UAV to continue along the flight path without executing an avoidance maneuver. In evaluating whether descent may be "better than" nominal, block 720, and/or whether descent may be "better than" stopping only, block 730, the evaluation compares whether a distance of separation at the CPA is increased by descending the UAV compared to remaining on the nominal path or stopping the UAV. In examples where block 706 may produce the largest separation at CPA, the evaluation may further consider block 708, "Intruder Below Ownship". Block 708 may be required to be set to FALSE in order to satisfy the descent maneuver selection. Thus, in evaluating avoidance maneuvers, descent may be determined better than stopping only and/or nominal if block 706 is TRUE (e.g., separation at CPA may be increased by descent) and block 708 is FALSE (e.g., aircraft is not below the UAV). Block 708 mitigates the logic selecting block 706, descending the UAV, if the aircraft is below the UAV. In some examples, the aircraft must be at least a threshold distance below the UAV to satisfy the condition in block 708.

Figure 8:
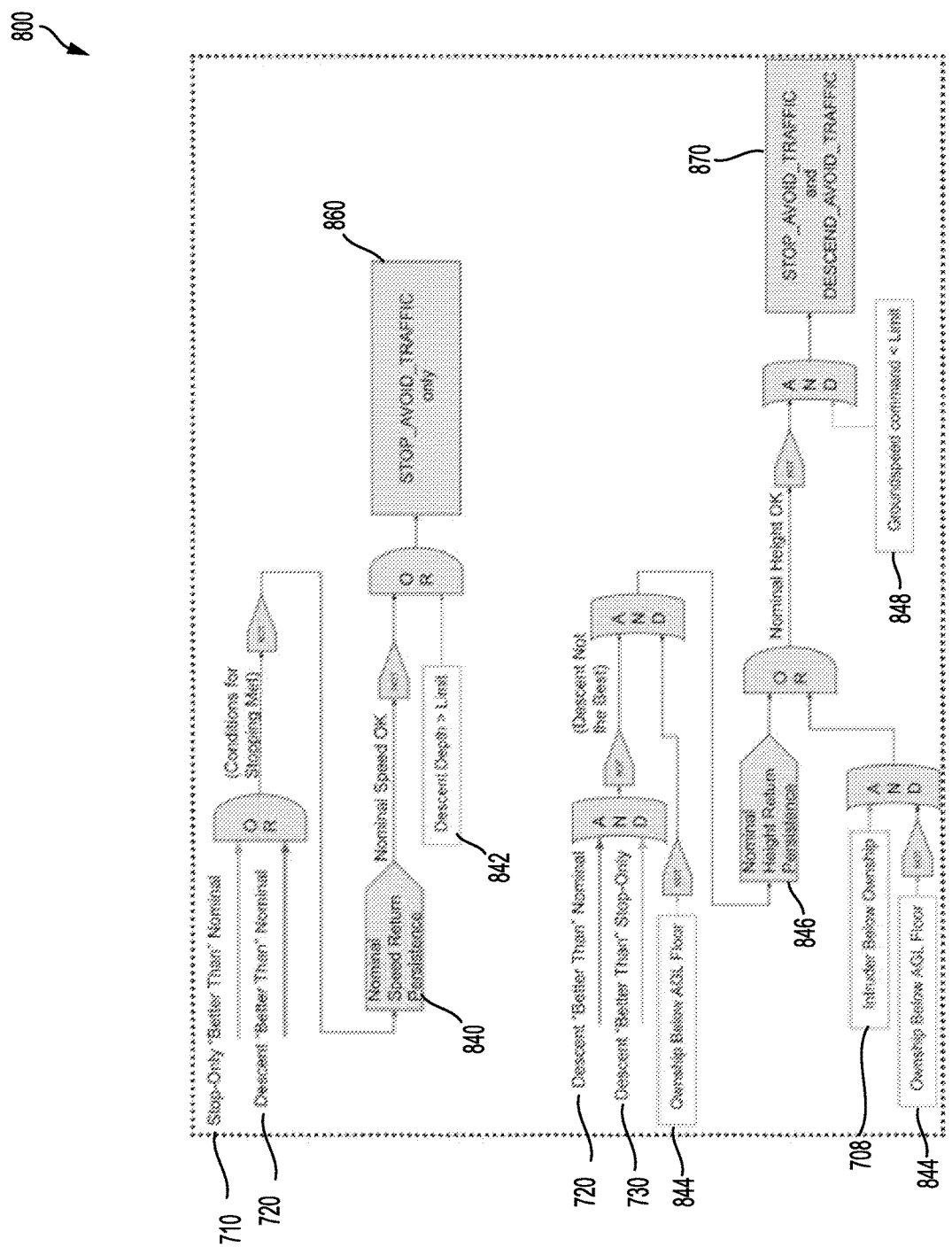
FIG. 8 is a logic diagram showing a maneuver determination when a traffic conflict warning is received, in accordance with example embodiments.

FIG. 8 is a logic diagram showing a maneuver determination 800 when a traffic conflict warning is received, in accordance with example embodiments. The maneuver determination 800 may include selections of flight control systems (FCS) limitations when determining the appropriate avoidance maneuver for the UAV to perform in response to the traffic conflict. The maneuver determination 800 may use the outputs from FIG. 7, such as blocks 710, 720, and 730, as inputs for output determinations based on FCS limitations.

The example shown includes output block 860, "STOP_AVOID_TRAFFIC only." Block 860 may be set to TRUE if either just stopping the UAV, block 710, or stopping and descending the UAV, block 720, has been determined to be better than nominal (e.g., the UAV continuing along the flight path). In some examples, once the maneuver determination 800 has determined conditions for stopping are met, a persistence timer 840 must be satisfied before the block 860 may be cleared and the UAV may continue traveling along the flight path. The persistence timer 840 may require the UAV to commit to decelerating for a set amount of time before it may be determined to resume nominal speed and continue along the flight path. In some examples, block 860 may be set to TRUE when the persistence timer 840 is satisfied and "Nominal Speed OK" is FALSE. Block 842, "Descent Depth>Limit," may consider the current altitude of the UAV. For example, block 860 may be set to TRUE when the UAV has already descended to an altitude less than the flight path and may not have sufficient time to climb to an altitude where the UAV may begin accelerating groundspeed.

The example shown includes block 870, "STOP_AVOID_TRAFFIC and DESCEND_AVOID_TRAFFIC." Block 870 may be set to true when descent may be better than nominal, block 720, and descent may be better than stopping only, block 730. In some examples, the maneuver determination 800 considers whether the UAV may be below a minimum AGL altitude, block 844 "Ownship Below AGL Floor." When it is determined that descent may be better than nominal and stopping only, and block 844 is set to FALSE, a persistence timer 846 must be satisfied before block 870 may be cleared and the UAV may return to nominal height of the flight path. Block 870 may be set to TRUE when "Nominal Height OK" is set to FALSE and block 848 is set to TRUE. In examples where the UAV is below the "AGL Floor", satisfying block 844, the UAV may be controlled to stay below the AGL floor while the traffic conflict warning persists. The UAV may hover while below the AGL floor. Hovering below the AGL Floor may be considered to be safer than attempting to climb the UAV back up to the flight path while avoiding the aircraft. The inclusion of block 708 may serve as a redundant safety check to verify the aircraft may not be below the UAV prior to setting block 870 as TRUE. This may increase overall safety of the maneuver in situations where the aircraft is below the UAV in close proximity. However, in examples where block 708 is set to TRUE the maneuver determination 800 may override the persistence timer 846. This may allow the UAV to react quickly in this condition.

Figure 9:
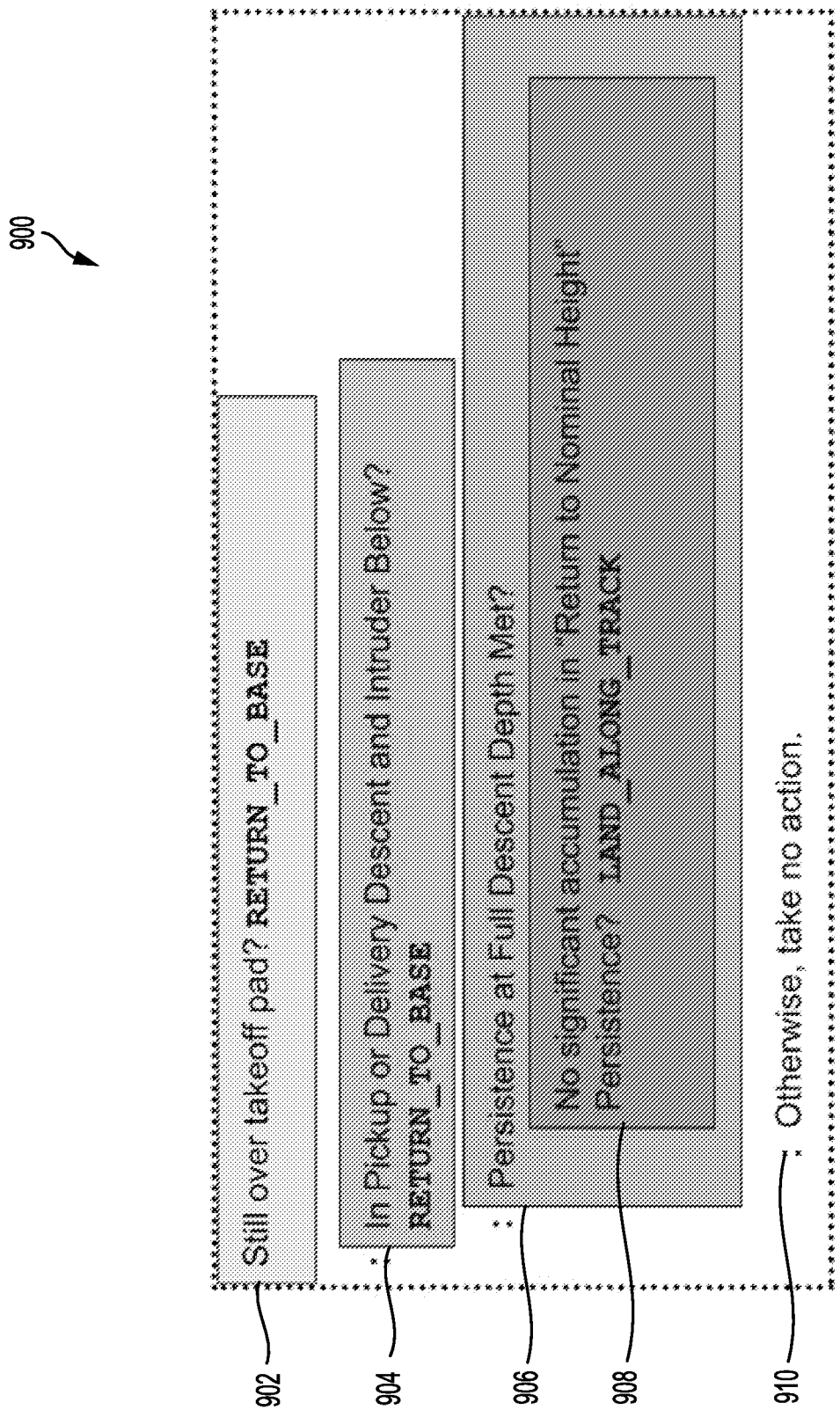
FIG. 9 is a logic diagram showing contingency actions when a traffic conflict warning is received, in accordance with example embodiments.

FIG. 9 is a logic diagram showing a contingency action 900 when a traffic conflict warning is received, in accordance with example embodiments. In block 902, the logic may determine whether the UAV may be over a takeoff pad when the traffic conflict is detected. In block 904, the logic may determine whether the UAV is in pickup or delivery descent when the traffic conflict is detected. Block 904 may further involve determining whether the aircraft is below the UAV during pickup or delivery descent. In block 906, the logic may determine whether a persistence timer has been met while the UAV is at a full descent depth, such as the hover position. When the persistence timer at the full descent depth has been met in block 906, the logic may evaluate an amount of time on a "Return to Nominal Height" persistence timer, block 908. In some examples, block 908 may be satisfied if the time of the persistence timer is below a threshold amount. In block 910, the logic may determine whether any of the conditions in blocks 902-908 have been satisfied, otherwise no contingency action may be taken. Within examples, the logic for triggering the contingency action 900 may be related to the FCS Limitation logic discussed in FIG. 8, but the contingency action 900 may be determined separately to reduce overall complexity.

In examples where the UAV may still be over the takeoff pad, such as block 902, when the traffic conflict may be indicated, the contingency action 900 may be triggered to return the UAV to base (e.g., RETURN_TO_BASE). The action of returning the UAV to base, when triggered in block 902 may result in the UAV landing on the takeoff pad. In examples where the UAV may be in pickup or delivery descent when the aircraft is detected below the UAV, such as block 904, the traffic conflict may trigger the contingency action 900 of returning the UAV to base (e.g., RETURN_TO_BASE) to avoid a potential collision with the aircraft below the UAV. The action of returning the UAV to base if triggered when there is the aircraft may be below the UAV at delivery or pickup, such as block 904, may result in the UAV aborting descent and climbing away from the aircraft. With respect to block 906, the UAV may be triggered to land on the ground (e.g., LAND_ALONG_TRACK) based on the UAV being at the full descent depth and satisfying the persistence timer. In further examples of block 906, the UAV may land on the ground when the persistence timer at full depth has been satisfied and block 908 has been satisfied (e.g., the "Return to Nominal Height" persistence timer is below the threshold amount).

VII. Example Method

Figure 10:
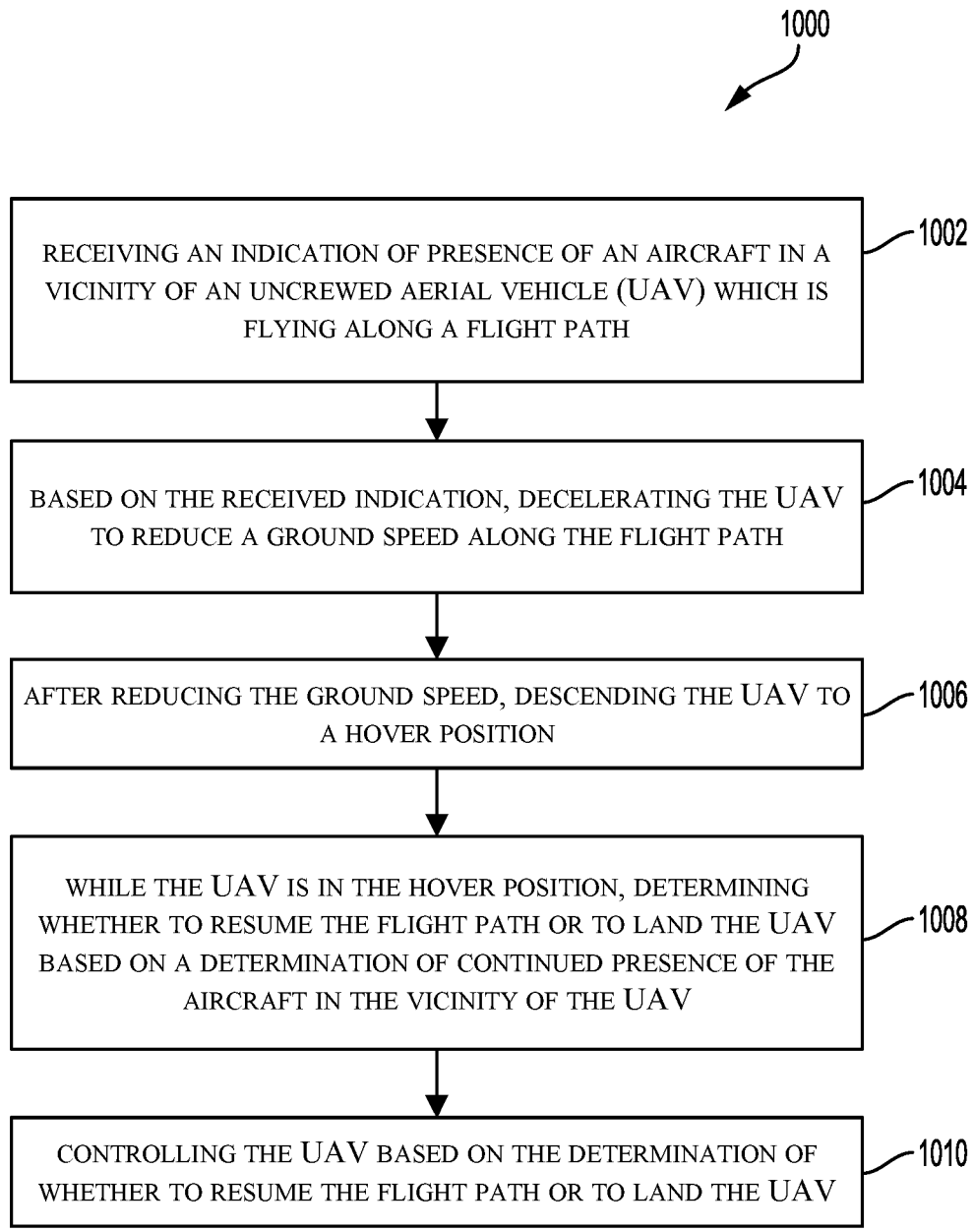
FIG. 10 is a simplified block diagram of a method, in accordance with example embodiments.

FIG. 10 is a block diagram of method 1000, in accordance with example embodiments. In some examples, method 1000 may be carried out by a control system. In further examples, method 1000 may be carried out by one or more processors, executing program instructions stored in a data storage. Execution of method 1000 may involve a UAV, such as the UAV illustrated and described with respect to FIGS. 1-2. Other UAVs may also be used in the performance of method 1000. In further examples, some or all of the blocks of method 1000 may be performed by a control system remote from the UAV. In yet further examples, different blocks of method 1000 may be performed by different control systems, located on and/or remote from a UAV.

As mentioned, FIG. 10 is a block diagram of method 1000, in accordance with example embodiments.

At block 1002, method 1000 includes receiving an indication of presence of an aircraft in a vicinity of an uncrewed aerial vehicle (UAV) which is flying along a flight path.

At block 1004, method 1000 includes based on the received indication, decelerating the UAV to reduce a ground speed along the flight path.

At block 1006, method 1000 includes after reducing the ground speed, descending the UAV to a hover position.

At block 1008, method 1000 includes while the UAV is in the hover position, determining whether to resume the flight path or to land the UAV based on a determination of continued presence of the aircraft in the vicinity of the UAV.

At block 1010, method 1000 includes controlling the UAV based on the determination of whether to resume the flight path or to land the UAV.

In some examples, the indication of presence of the aircraft in the vicinity of the UAV is based on sensor data from a sensor located at ground level.

In some examples, the indication of presence of the aircraft in the vicinity of the UAV is received from a sensor located on the UAV.

In some examples, the method 1000 may further include determining, based on the received indication, whether a potential conflict exists between the aircraft and the UAV, where determining whether the potential conflict exists includes (i) projecting a first predicted trajectory of the aircraft, and (ii) projecting a second predicted trajectory of the UAV, where decelerating the UAV is further based on determining whether the potential conflict exists.

In some examples, descending the UAV to the hover position is performed once the ground speed of the UAV is reduced below a threshold value.

In some examples, the hover position is above a predefined minimum height above ground level.

In some examples, prior to determining whether to resume the flight path or to land the UAV based on the determination of continued presence of the aircraft in the vicinity of the UAV, the method 1000 may further include initiating a persistence timer having a set amount of time for the determination whether to resume the flight path or to land the UAV to be made.

Within examples of the above, the set amount of time of the persistence timer is based on a remaining energy level of at least one battery of the UAV and a remaining energy requirement of the UAV along the flight path.

In some examples, where controlling the UAV based on the determination to land the UAV, the method 1000 may further include using a descent control system to land the UAV based on a downward facing sensor on the UAV.

In some examples, where after receiving the indication of presence of the aircraft in the vicinity of the UAV, the method 1000 may further include determining whether a distance of separation between the aircraft and the UAV at a closest point of approach is expected to improve by decelerating the UAV to reduce ground speed or by descending the UAV to the hover position, where decelerating the UAV is further based on determining whether the distance of separation between the aircraft and the UAV at the closest point of approach is expected to improve.

In some examples, decelerating the UAV to reduce ground speed along the flight path and descending the UAV to the hover position is based on a determination that the aircraft is not below the UAV.

VIII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving an indication of presence of an aircraft in a vicinity within a sensor detection range of an uncrewed aerial vehicle (UAV) which is flying along a flight path;
   based on the received indication, decelerating the UAV to reduce a ground speed along the flight path;
   after reducing the ground speed, descending the UAV to a hover position;
   when the UAV descends to the hover position and stops descending, initiating a persistence timer having a set amount of time to make a conditional determination, wherein the conditional determination comprises:
      determining to resume the flight path, based on a further indication of the aircraft leaving the vicinity of the UAV within the set amount of time;
      determining to land the UAV, based on continued presence of the aircraft in the vicinity of the UAV for the set amount of time; and
   controlling the UAV based on the conditional determination.

2. The method of claim 1, wherein the indication of presence of the aircraft in the vicinity of the UAV is based on sensor data from a sensor located at ground level.

3. The method of claim 1, wherein the indication of presence of the aircraft in the vicinity of the UAV is received from a sensor located on the UAV.

4. The method of claim 1, further comprising:
   determining, based on the received indication, whether a potential conflict exists between the aircraft and the UAV, wherein determining whether the potential conflict exists comprises:
   projecting a first predicted trajectory of the aircraft; and
   projecting a second predicted trajectory of the UAV, wherein decelerating the UAV is further based on determining whether the potential conflict exists.

5. The method of claim 1, wherein descending the UAV to the hover position is performed once the ground speed of the UAV is reduced below a threshold value.

6. The method of claim 1, wherein the hover position is above a predefined minimum height above ground level.

7. The method of claim 1, wherein the set amount of time of the persistence timer is based on a time remaining on a planner-reserved flight volume.

8. The method of claim 1, wherein the set amount of time of the persistence timer is based on a remaining energy level of at least one battery of the UAV and a remaining energy requirement of the UAV along the flight path.

9. The method of claim 1, wherein controlling the UAV based on the conditional determination to land the UAV further comprises:
   using a descent control system to land the UAV based on a downward facing sensor on the UAV.

10. The method of claim 1, wherein after receiving the indication of presence of the aircraft in the vicinity of the UAV, the method further comprises:
    determining whether a distance of separation between the aircraft and the UAV at a closest point of approach is expected to improve by decelerating the UAV to reduce ground speed or by descending the UAV to the hover position, wherein decelerating the UAV is further based on determining whether the distance of separation between the aircraft and the UAV at the closest point of approach is expected to improve.

11. The method of claim 1, wherein decelerating the UAV to reduce ground speed along the flight path and descending the UAV to the hover position is based on a conditional determination that the aircraft is not below the UAV.

12. An uncrewed aerial vehicle (UAV), comprising:
    a control system configured to:
    receive an indication of presence of an aircraft in a vicinity within a sensor detection range of the UAV which is flying along a flight path;
    based on the received indication, decelerate the UAV to reduce ground speed along the flight path;
    after reducing the ground speed, descend the UAV to a hover position;
    when the UAV descends to the hover position and stops descending, initiate a persistence timer having a set amount of time to make a conditional determination, wherein the conditional determination comprises:
       determining to resume the flight path, based on a further indication of the aircraft leaving the vicinity of the UAV within the set amount of time; and
       determining to land the UAV, based on continued presence of the aircraft in the vicinity of the UAV for the set amount of time; and
    controlling the UAV based on the conditional determination.

13. The UAV of claim 12, wherein the control system is further configured to:
    while the UAV is decelerating to reduce ground speed or descending to a hover position, receive a second indication that the aircraft is no longer in the vicinity of the UAV;
    based on the received second indication, resume flight of the UAV along a flight path.

14. The UAV of claim 12, wherein the control system is further configured to:
    return the UAV to a point of origin based on a determination that the aircraft is below the UAV.

15. A non-transitory computer readable medium comprising program instructions executable by one or more processors to perform operations comprising:
    receiving an indication of presence of an aircraft in a vicinity within a sensor detection range of an uncrewed aerial vehicle (UAV) which is flying along a flight path;
    based on the received indication, decelerating the UAV to reduce ground speed along the flight path;
    after reducing the ground speed, descending the UAV to a hover position;
    when the UAV descends to the hover position and stops descending, initiating a persistence timer having a set amount of time to make a conditional determination, wherein the conditional determination comprises:
       determining to resume the flight path, based on a further indication of the aircraft leaving the vicinity of the UAV within the set amount of time; and determining to land the UAV, based on continued presence of the aircraft in the vicinity of the UAV for the set amount of time; and controlling the UAV based on the conditional determination.

16. The non-transitory computer readable medium of claim 15, wherein receiving the indication of presence of the aircraft in the vicinity of the UAV is based on sensor data from a sensor located at ground level.

17. The non-transitory computer readable medium of claim 15, wherein receiving the indication of presence of the aircraft in the vicinity of the UAV is received from a sensor located on the UAV.

18. The non-transitory computer readable medium of claim 15, wherein the operations further comprise:

determining, based on the received indication, whether a potential conflict exists between the aircraft and the UAV, wherein determining whether the potential conflict exists comprises:

projecting a first predicted trajectory of the aircraft; and projecting a second predicted trajectory of the UAV, wherein decelerating the UAV is further based on determining whether the potential conflict exists.

19. The non-transitory computer readable medium of claim 15, wherein after receiving the indication of presence of the aircraft in the vicinity of the UAV, the operations further comprise:

determining whether a distance of separation between the aircraft and the UAV at a closest point of approach is expected to improve by decelerating the UAV to reduce ground speed or by descending the UAV to the hover position, wherein decelerating the UAV is further based on determining whether the distance of separation between the aircraft and the UAV at the closest point of approach is expected to improve.

* * * * *